United States Patent
Kumar

(10) Patent No.: US 8,266,064 B1
(45) Date of Patent: Sep. 11, 2012

(54) PURCHASES FOR ANOTHER INVOLVING DIGITAL CONTENT ITEMS

(75) Inventor: Bharath Kumar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1015 days.

(21) Appl. No.: 12/044,380

(22) Filed: Mar. 7, 2008

(51) Int. Cl.
| | |
|---|---|
| *G06Q 30/00* | (2012.01) |
| *G07B 17/00* | (2006.01) |
| *G07F 19/00* | (2006.01) |
| *G06F 17/00* | (2006.01) |
| *G06F 15/16* | (2006.01) |
| *G06F 3/00* | (2006.01) |
| *G06F 13/00* | (2006.01) |
| *G06F 7/04* | (2006.01) |
| *G06F 17/30* | (2006.01) |
| *G06G 7/00* | (2006.01) |
| *H04N 7/16* | (2011.01) |
| *H04N 5/445* | (2011.01) |

(52) U.S. Cl. ......... 705/64; 705/26.1; 705/27.1; 705/30; 705/400; 709/206; 725/1; 725/46; 726/26

(58) Field of Classification Search ............... None
See application file for complete search history.

(56) References Cited

U.S. PATENT DOCUMENTS

| | | | | | |
|---|---|---|---|---|---|
| 6,321,211 | B1 * | 11/2001 | Dodd | | 705/26.8 |
| 7,130,817 | B2 * | 10/2006 | Karas et al. | | 705/26.8 |
| 7,412,411 | B2 * | 8/2008 | Horel et al. | | 705/26.8 |
| 7,881,976 | B2 * | 2/2011 | Dayton et al. | | 705/26.1 |
| 8,065,742 | B2 * | 11/2011 | Shukla et al. | | 726/28 |
| 2005/0251285 | A1 * | 11/2005 | Boyce et al. | | 700/226 |
| 2007/0006327 | A1 * | 1/2007 | Lal et al. | | 726/31 |
| 2008/0051071 | A1 * | 2/2008 | Vishwanathan et al. | ... | 455/414.1 |
| 2008/0189188 | A1 * | 8/2008 | Morgenstern | | 705/26 |
| 2008/0242406 | A1 * | 10/2008 | Irving et al. | | 463/29 |
| 2008/0294453 | A1 * | 11/2008 | Baird-Smith et al. | | 705/1 |
| 2009/0240593 | A1 * | 9/2009 | Kelly et al. | | 705/26 |

* cited by examiner

*Primary Examiner* — Calvin L Hewitt, II
*Assistant Examiner* — Emile Su
(74) *Attorney, Agent, or Firm* — Thomas, Kayden, Horstemeyer & Risley, LLP

(57) ABSTRACT

Disclosed are various embodiments of systems, methods, and programs embodied in computer readable mediums for facilitating the purchase involving digital content items by purchasing parties for other recipients. For example, a server may be employed to encode at least one network page that facilitates a purchase involving a digital content item in an electronic commerce system by a first party to be delivered via a network to a destination device of a second party. The electronic commerce system may also initiate a disposition of the digital content item via the network with respect to the second party upon a consummation of the purchase by the first party.

31 Claims, 10 Drawing Sheets

User Digital Delivery Profile

Name: John Doe
Account Number: 239583409825

[Add/Delete Device]

Portable Media Player:

Destination: [IP Address ▽] [192.168.0.29]

☐ Share device
☐ Do not share device
☒ Share with specified people [Add/Delete]

[Audio Default ▽]

Jane Doe
Jarred Smith
Thomas Lighthouse
Laslo Razoul

Download Preference:
☐ Auto download
☐ Queue for download

Delivery Rules: [Add/Delete Rule]

Movies with a rating of "G" only
Only accept music of the following genres: Jazz, Pop Rock, Classical, Country
Gifts must have a monetary value of less than or equal to $100
Accept all items on wish list regardless of whether another rule is violated

Set Top Box:

Destination: [Account Number ▽] [324098570124897]

☐ Share device
☐ Do not share device
☒ Share with specified people [Add/Delete]

[Audio Default ▽]

Jane Doe
Jarred Smith
Thomas Lighthouse
Laslo Razoul

Download Preference:
☐ Auto download
☐ Queue for download

Delivery Rules: [Add/Delete Rule]

FIG. 2

Add a Rule                                                 233

☐ Do not accept an item worth more than $____
☐ Accept movies of the following genres: [click here to add genres]
☐ Accept movies with a rating of [click here to add ratings]
☐ Accept music from the following categories: [click here to add categories]
☐ Do not accept items from the following categories: [click here to add categories]
☐ Do not accept the following items: [click here to access the catalog to specify items]
☐ Accept only items purchased from [click here to specify merchants]
☐ Accept only items that were included in my wishlist
⌐236
          ○
          ○
          ○
                                                        [ Add ]

Purchase Digital Content

Search: [          ]

Artist: Frank Sinatra

| Song Title  143           | Album                              | Price |
|---------------------------|------------------------------------|-------|
| ☒ My Way (Live)           | Sinatra 80$^{th}$ – Live in Concert| $.99  |
| ☒ New York, New York      | Sinatra 80$^{th}$ – Live in Concert| $.99  |
| ☐ Love and Marriage       | Frank Sinatra: The Complete Capitol...| $.99 |
| ☐ Strangers in the Night  | Sinatra 80$^{th}$ – Live in Concert| $.99  |
| ☐ I've Got the World on a String | Classic Sinatra             | $.99  |
| ☐ Young at Heart          | Classic Sinatra                    | $.99  |
| ☒ Come Fly with Me        | Come Fly with Me (Rental)          | $.99  |

⌐243       ⌐246
      [ Purchase ]

Send Digital Content to Someone

| Items to Send: | Album | Price |
|---|---|---|
| ☒ My Way (Live) | Sinatra 80th – Live in Concert | $.99 |
| ☒ New York, New York | Sinatra 80th – Live in Concert | $.99 |
| ☒ Come Fly with Me | Come Fly with Me (Rental) | $.99 |

283

143

Please specify the recipient(s) of the selected digital items.

List of Potential Recipients: 263    Recipients: 196    266

```
Jane Doe                    Joseph Doe
Joseph Doe
Thomas Lighthouse    →
Laslo Razoul           276
Joe Smith              ←
Susan Day
Michael Jones
```

Search:    Search Results: ↑ ↓  279

| Adam Smith | Go | ☐ Adam Smith, Kalamazoo, MI |
|---|---|---|
| | | ☒ Adam Smith, Sacramento, CA |
| | | ☐ Adam Smith, Seattle, WA |

269

Please select the device of the current highlighted recipient above to which the selected digital item(s) are to be delivered if other than the default selected device below:

☒ Portable Media Player (Audio Default)
☐ Set Top Box
☐ Computer System      206
☐ Cellular Telephone
☐ Ebook Reader

273

286

Submit

Send Digital Content to Someone                                303

| Items to Send: | Album | 143 Price | Recipient Filter |
|---|---|---|---|
| ☒ My Way (Live) | Sinatra 80ᵗʰ – Live in Concert | $.99 | ✓ |
| ☒ New York, New York | Sinatra 80ᵗʰ – Live in Concert | $.99 | ✗ (* See Below) |
| ☒ Come Fly with Me | Come Fly with Me | $.99 | ✓  306 |

283  * Warning: This item violates a condition of acceptance of the highlighted recipient and will not be delivered to the highlighted recipient. You will not be charged for this item.
309

Please specify the recipient(s) of the selected digital items.

List of Potential Recipients:  263            Recipients:    266

| Jane Doe |
| Joseph Doe |
| Thomas Lighthouse |
| Laslo Razoul |
| Joe Smith |
| Susan Day |
| Michael Jones |

→
276
←

| Joseph Doe |

Search:                                      Search Results:   ↑ ↓  279

| Adam Smith | Go |

| ☐ Adam Smith, Kalamazoo, MI |
| ☒ Adam Smith, Sacramento, CA |
| ☐ Adam Smith, Seattle, WA |

269

Please select the device of the current highlighted recipient above to which the selected digital item(s) are to be delivered if other than the default selected device below:

☒ Portable Media Player (Audio Default)
☐ Set Top Box
☐ Computer System           206
☐ Cellular Telephone
☐ Ebook Reader
273

286
| Submit |

FIG. 6

Send Digital Content to Someone

169d

| Song Title | Album | Price | Recipient Filter |
|---|---|---|---|
| ☒ One For My Baby | Frank Sinatra Sings For Only the Lonely | Re-gift | ✓ —143 |

↖—283

Please specify the recipient(s) of the selected digital items.

List of Potential Recipients:

Jane Doe
Judy Doe
Laslo Razoul
Joe Smith
Susan Day
Michael Jones

→
←

Recipients:

Charlie Brown

Search:

Brown    Go

Search Results:  ↑ ↓

☐ Brown, Joe, Los Angeles, CA
☒ Brown, Charlie, Cleveland, OH
☐ Brown, Susan, Phoenix, AZ

Please select the device of the current highlighted recipient above to which the selected Digital Item(s) are to be delivered if other than the default selected device below:

☒ Portable Media Player
☐ Set Top Box
☐ Computer System    206
☐ Cellular Telephone
☐ Ebook Reader

286

Submit

FIG. 8

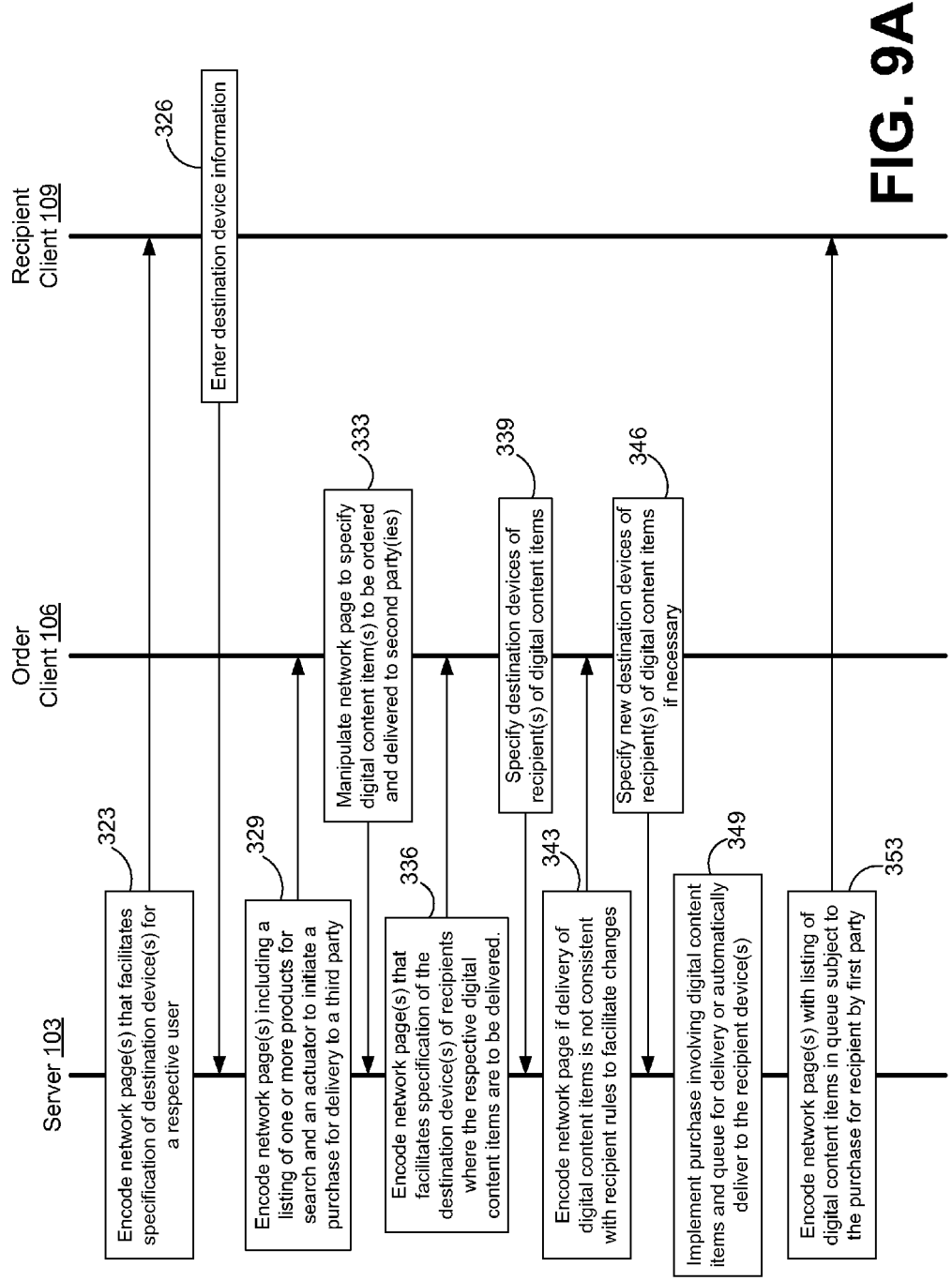

PURCHASES FOR ANOTHER INVOLVING DIGITAL CONTENT ITEMS

BACKGROUND

Merchants who sell their wares online have begun to sell digital content items such as movies, songs in MP3 format, or other digital content directly to customers. In this respect, customers may manipulate browsers or other applications to purchase such digital content that can then be downloaded by the user for use on an appropriate device. However, current online systems do not allow users to purchase a digital content item as a gift for others.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a drawing of an example of a network page that facilitates entry of delivery data for a user in the network of FIG. 1 according to various embodiments of the present disclosure;

FIG. 3 is a drawing of an example of a network page that facilitates entry of delivery rules for a user in the network of FIG. 1 according to various embodiments of the present disclosure;

FIG. 4 is a drawing of an example of a network page that facilitates selection of digital content items for purchase in the network of FIG. 1 according to various embodiments of the present disclosure;

FIG. 5 is a drawing of an example of a network page that facilitates specification of recipients and destination devices for digital content items in the network of FIG. 1 according to various embodiments of the present disclosure;

FIG. 6 is a drawing of an example of a network page that further facilitates specification of recipients and destination devices for digital content items in the network of FIG. 1 according to various embodiments of the present disclosure;

FIG. 8 is a drawing of an example of a network page that facilitates the redirecting of a digital content item purchased by another in the network of FIG. 1 according to various embodiments of the present disclosure;

FIGS. 9A-9B depict a flow diagram that provides one example illustration of the various functions of a server and clients in the network of FIG. 1 according to various embodiments of the present disclosure.

DETAILED DESCRIPTION

Figure 1:
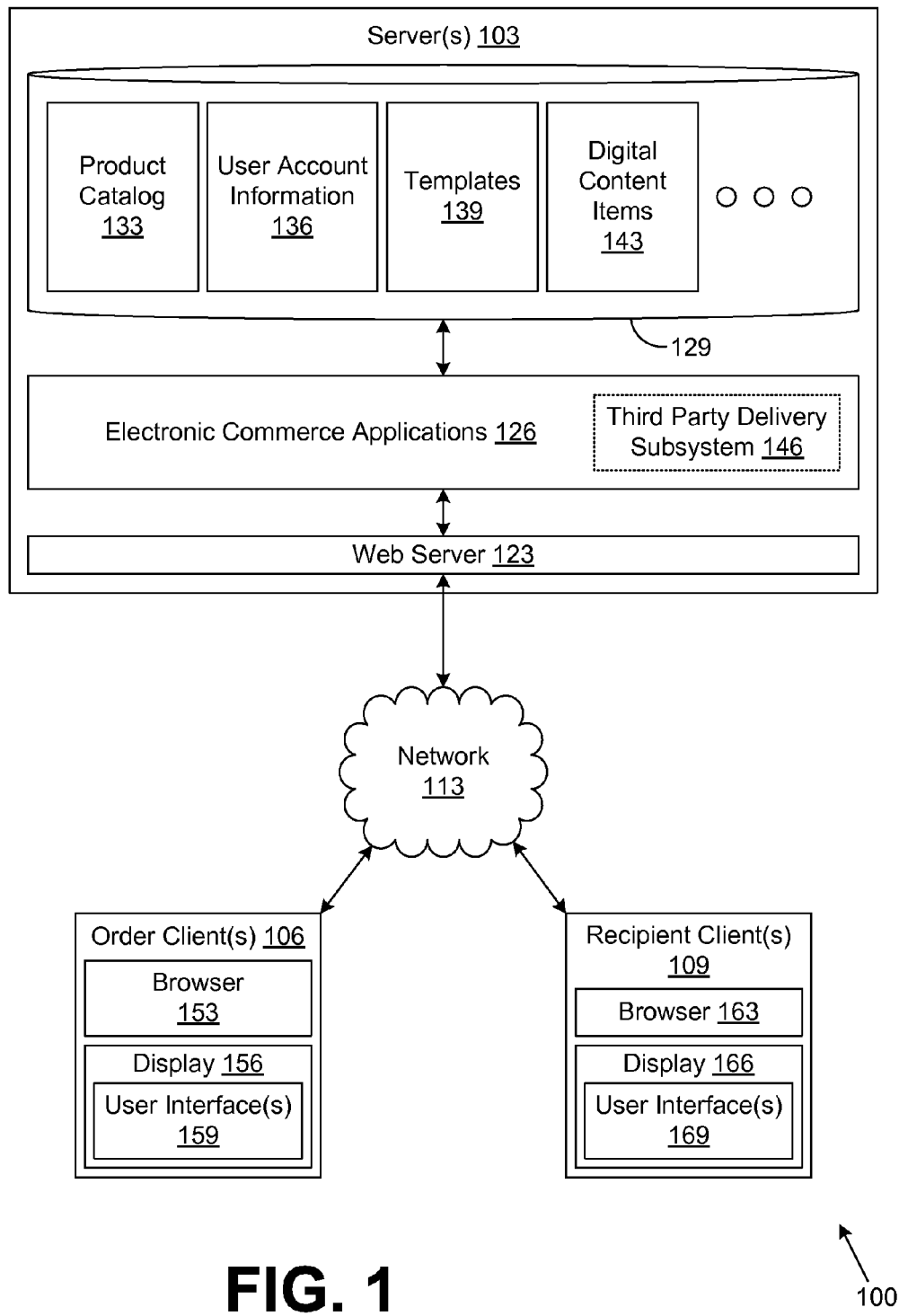
FIG. 1 is a drawing of a digital purchase and fulfillment network according to various embodiments of the present disclosure.

With reference to FIG. 1, shown is a networked environment 100 that includes, for example, at least one server 103, an order client 106, and a recipient client 109. The server 103 may represent multiple servers that may be arranged to work in coordination with each other. Alternatively, such servers 103 may be arranged in some other manner, as can be appreciated. The clients 106 and 109 are configured to access information on the server 103 as will be described. Both the server 103 and the clients 106 and 109 are coupled to a network 113. The network 113 may comprise, for example, any type of network environment such as the Internet, intranets, local area networks, wide area networks, wireless networks, or other networks, or a combination of two or more of such networks as can be appreciated. Although only a single order client 106 and a single recipient client 109 are shown, both the order client 106 and recipient client 109 represent many order clients 106 and recipient clients 109 that can exist on the network 113.

According to various embodiments, the server 103 includes various applications that are executed, for example, to effect the ordering of goods and order fulfillment for a merchant such as an on-line merchant or a brick and mortar retail outlet. To this end, the systems executed on the servers 103 include, for example, a web server 123, and various electronic commerce applications 126. The web server 123 comprises a subsystem that is employed to provide browser access to the various electronic commerce applications 126, although it is understood that other technologies beyond web servers 123 may be employed.

The electronic commerce applications 126 are executed in order to receive orders for goods or services generated by the order client 106. The electronic commerce applications 126 also ensure the fulfillment of such orders as is consistent with the operations of online merchants, for example, that employ such online systems. To this end, the electronic commerce applications 126 may access data stored in a data store 129. The data in the data store is used during the normal operation of the electronic commerce applications 126. For example, stored within the data store 129 are a product catalog 133, user account information 136, graphical user interface templates 139, and other information as can be appreciated.

The product catalog 133 may include various details about various products that are offered for sale through the electronic commerce applications 126. The user account information 136 may include personal information about various customers such as, for example, account number, name, address, methods of payment such as credit card numbers, personal interests, and other information used by a merchant to market goods to such users. The templates 139 may include various user interface layouts and other components that are used by the electronic commerce applications 126 to generate user interfaces that are served up to clients 106/109 as will be described. In addition, there may be other information included in the data store 129 in order to conduct electronic commerce as can be appreciated.

Also stored on the data store 129 are digital content items 143 that may be listed within the product catalog 133. The digital content items 143 may be purchased by individuals who manipulate clients coupled to the network 113. Such digital content items 143 may be served up directly to such clients or may be served up to destination devices other than the clients used to order such content items 143. The digital content items 143 may comprise, for example, audio content such as songs, video content such as movies, digital text content such as books for electronic book readers, or other media in digital form that may be transmitted from the servers 103 to the clients 106/109 or other destination devices when purchased. In some embodiments, users of the order client 106 may order and purchase the digital content items 143 to be delivered to specified destination devices of recipients that may be defined using the recipient client 109 as will be described. Alternatively, the destination device may comprise the recipient client 109. According to the various embodiments, the destination device may comprise, for example, a portable media player such as an MP3 player, a set top box that is used with a television, a computer system, a personal digital assistant, a cellular telephone, an electronic book reader (ebook reader), or other device.

One of the electronic commerce applications 126 is a third party delivery subsystem 146. According to various embodiments, the third party delivery subsystem 146 is executed in the servers 103 as part of the electronic commerce applications 126 in order to facilitate the ordering of digital content items 143 from the electronic commerce applications 126 to be delivered to third party recipients. In such transactions, a given user purchases digital content items 143 that are delivered to destination devices that belong to someone else as will be described.

The order client 106 may include a browser 153 that is manipulated to interface with the web server 123 to allow the order client 106 to interface with the electronic commerce applications 126 as can be appreciated. In addition, the order client 106 may include a display device 156 that is employed to render user interfaces 159 that may comprise a portion of a network page such as a web page, for example, that is encoded by the electronic commerce applications 126 and served up to the order client 106 through the web server 123. While the order client 106 is shown as including a browser 153, it is possible that the order client 106 may employ some other technology that allows the order client 106 to interface with the server 103 as can be appreciated.

The recipient client 109 also includes a browser 163 and a display device 166. Rendered upon the display device 166 are user interfaces 169 that may comprise portions of network pages such as a web pages, for example, that are encoded by the electronic commerce applications 126 and served up to the recipient client 109 through the web server 123. Such network pages may be generated dynamically using various software platforms such as AJAX, PERL, JAVA, or other software platforms as can be appreciated.

The user of a recipient client 109 may manipulate the respective user interfaces 169 to effect the delivery of a digital content item 143 purchased for the respective user by a user of a respective order client 106. In addition, a user may manipulate the user interface(s) 169 rendered on the display device 166 of the recipient clients 109 to facilitate other functions as will be described. The display device 166 may be any type of display device including a liquid crystal display (LCD), a cathode-ray tube (CRT), a flat plasma panel display, or other display device.

Next, a general discussion is provided of the operation of the various components described above in implementing purchases involving digital content items 143 by a first party to be delivered to a destination device of a second party according to various embodiments. To begin, a given user of a recipient client 109 provides personal information including information related to the various destination devices associated with such user to the electronic commerce applications 126. This may be accomplished by manipulating one or more user interfaces 169 generated by the server 103 and served up to the recipient client 109.

Such information will ultimately be transmitted to the server 103 from the recipient client 109 and stored in the data store 129. Ultimately, this information is used to facilitate a purchase involving digital content items 143 for the user of the recipient client 109 (a "recipient") as will be described. In providing information associated with a given destination device, a given recipient may specify address information, download preferences, and other information needed to facilitate the download of digital content items 143 to respective destination devices. Also, a given recipient may specify various rules that govern the downloading of digital content items 143 to respective destination devices as will be described.

Once the destination devices and other information have been properly specified by a recipient, then third parties may make purchases involving digital content items 143 to be delivered to such destination devices of the recipient as a gift or for some other purpose. To this end, the electronic commerce applications 126 may generate various user interfaces 159 that facilitate the selection of digital content items 143 involved in a purchase. The user interfaces 159 may facilitate the actual purchase of digital content items 143 for a recipient, or may purchase a rental, subscription, or lease of a digital content item 143 for a recipient. In this respect, a purchase that "involves" a digital content items 143 refers to either the actual purchase of the digital content item 143, or the purchase of a rental, subscription, or lease relating to a digital content item 143. Also, the third party delivery subsystem 146 of the electronic commerce applications 126 generates appropriate user interfaces 159 that facilitate the selection of the destination devices of recipients to which any digital content items 143 involved with the purchase are to be transmitted.

Once a user of an order client 106 has selected items involved in a purchase made for a third party and has selected the destination devices to which such digital content items 143 are to be delivered, then the user may manipulate an appropriate user interface 159 to consummate the purchase involving such items and cause the third party delivery subsystem 146 of the electronic commerce applications 126 to initiate a disposition of the respective digital content items 143 to the respective destination devices. To do this, the third party delivery subsystem 146 may automatically proceed to download the digital content items 143, for example, to a respective destination device. The downloading of digital content items 143 to a destination device may be accomplished using the various approaches described in U.S. patent application Ser. No. 11/616,224 entitled "Remote Download of Content" filed on Dec. 26, 2006, which is incorporated herein by reference in its entirety. In order to implement the download of the digital content items 143, for example, the destination devices may be registered with the server 103 and also may execute a local agent in order to receive the digital content item 143, or other approaches may be employed.

Alternatively, rather than automatically downloading digital content items 143 to destination devices, the third party delivery subsystem 146 may list the digital content items 143 to be downloaded in a queue associated with the respective recipients. A recipient may then view the items in the queue on a recipient client 109 and initiate the download of digital content items 143 to respective destination devices. Alternatively, such a recipient may wish to change the destination devices to which items are to be downloaded. Also, a recipient may wish to exchange the digital content item 143 or receive credit therefore. Additionally, the third party delivery subsystem 146 may provide for user interfaces 169 that allow a given recipient to redirect or re-gift the digital content item 143 involved in the purchase for the recipient to a new recipient.

There are also many other aspects and functions related to the various components described above in conjunction with third party delivery of digital content items 143 with reference to various user interfaces 159 and 169 as set forth below.

In the discussion that follows, various user interfaces 159 and 169 are described in greater detail. It is understood that the components and layouts described therein are merely examples, where other types of components and layouts may be employed to accomplish the purposes served by the components shown.

With reference to FIG. 2, shown is one example of a user interface 169, denoted herein as user interface 169a, that is rendered on a recipient client 109. The user interface 169a is generated for a given recipient 196 that is assigned an account number 199 in the electronic commerce applications 126. The electronic commerce applications 126 provide for the authentication of the recipient 196 before the user interface 169a is generated. The user interface 169a allows a recipient 196 to input information about their destination devices. Such information may comprise, for example, a name or type of device, a network address, telephone number, or other information. The information input by a recipient 196 is stored in the user account information 136 of the server 103 in association with the recipient 196. This information facilitates the delivery of digital content items 143 to the destination devices, where the digital content items 143 were involved in a purchase by third parties manipulating an order client 106 according to the various embodiments.

The user interface 169a includes destination device boxes 203 having various user interface components that facilitate the entry of information with respect to a given destination device. For example, within each destination device box 203 is a designation of a destination device 206 that identifies the respective destination device. Each destination box 203 also includes a destination connection indicator 209 that allows a user to enter information by which a digital content item 143 may be sent to the respective destination device such as, for example, an address on a network (i.e. an IP address), a telephone number associated with a cell phone or personal digital assistant, etc., or destination connection indication.

The destination device box 203 further comprises a media type default indicator 211 that is employed to designate the respective destination device 206 as the default device for the type of media indicated in the media type default indicator 211. One may select a specific type of media for which the destination device box 203 is designated a default, or one may select "none" where the respective destination device 206 is not a default device for a particular media type. By indicating that a given destination device 206 is the default device for a specific media type by virtue of a selection using the media type default indicator 211, then the destination device is initially chosen as a default for the delivery of a digital content item 143 of the respective media type.

Each destination device box 203 also includes any number of sharing toggle components 213. The sharing toggle components 213 allow a recipient 196 to specify whether the respective destination device 206 is to be made available to others so as to allow others to specify the destination device 206 to receive digital content items 143. Alternatively, a sharing toggle component 213 is further provided that allows a recipient 196 to specify a list of individuals with whom the recipient 196 is willing to share the information about the destination device 206. As such, the information associated with such destination devices 206 is only made available to those individuals listed in the access list 216. Before such individuals can have access to the destination device information, the electronic commerce applications 126 provide for authentication of individuals to ensure that such information is made available to the listed individuals.

The user interface 169a further comprises a download preferences box 219 in which a recipient 196 may specify that digital content items 143 may be automatically downloaded to the given destination device 206, or may be queued up for delivery as directed by the recipient 196 when an appropriate user interface 169 is accessed as will be described.

Each of the destination device boxes 203 further includes a "rules" box 223 that lists a number of rules 226 that govern the circumstances under which digital content items 143 can be downloaded to the respective destination device 206. For example, the rules 226 may regulate the type of content that a recipient 196 is willing to receive at a given destination device 206. For example, the rules 226 may specify that only video digital content items 143 with a certain rating are to be downloaded. To this end, one may specify that "movies with a rating of 'G' only" can be downloaded to the given destination device 206. This may be desirable, for example, if the given destination device 206 is associated with a minor and a parent wishes that only children friendly movies are downloaded thereto.

Users may limit the types of digital content items 143 received in other ways as well. For example, a rule 226 may limit the receipt of digital content items 143 such as songs to specified genres such as, for example, jazz, pop rock, classical, country, or other genres. Similarly, a rule 226 may limit the receipt of digital content items 143 such as video content to specified genres such as action, drama, comedy, or other genres. Further, the rules 226 may specify that only digital content items 143 may be received that have a value that is under or over a predefined monetary limit.

In addition, a rule 226 may be specified that allows all items included in a wish list to be received regardless of whether the receipt of such an item would violate another rule 226 as can be appreciated. This may be determined by examining a wish list maintained in the data store 129 in association with the account number 199 of the recipient 196. If the recipient 196 has expressed a desire for a given digital content item 143 on a wish list, then one might create a rule 226 that indicates that all items associated with the respective account number 199 may be accepted regardless of whether they violate another one of the rules 226.

In addition, the user interface 169a includes components such as buttons to add or delete destination device boxes 203, buttons to add or delete individuals in the access list 216, or buttons to add or delete rules within the rule box 226.

Further, there may be other components included in the user interface 169a with respect to each of the destination device boxes 203 in order to facilitate the entry of additional information as may be needed. Also, it is possible that the same information shown in the example user interface 169a may be presented in some other manner with different components as compared to those described above.

In an alternative embodiment, it may be the case that the user interface 169a is not presented where a potential recipient does not wish to provide specific information regarding their destination devices 206. In another alternative, the recipient may have an account with the electronic commerce applications 126, but might not have specified any destination devices 206 to which digital content items 143 are to be delivered. However, such a recipient may have specified a means for communication with the electronic commerce applications 126 when setting up an account in order to facilitate the purchase involving digital content items. For example, a user might have specified an email address, telephone number, or other way of receiving a message. Rather than receiving a download of a digital content item 143 to a destination device, the digital content items 143 involved in a purchase for a recipient may be listed in a queue and a message such as an email or text message may be sent to the recipient to alert them of the fact that one or more digital content items 143 are available for download.

With reference to FIG. 3, shown is a user interface 169 that is rendered on a recipient client 109 (FIG. 1), denoted herein as user interface 169b, according to various embodiments. The user interface 169b includes a list of potential rules 233 that may be selected by manipulating the selectors 236 associated with each respective one of the prospective rules 233. The user interface 169b is generated in response to a manipulation of an "add rule" button that appears in a given destination device box 203 (FIG. 1) of the user interface 169a (FIG. 2) as described above.

A user may select prospective ones of the rules 233 to govern the delivery of digital content items 143 to the respective destination device 206 (FIG. 2). Upon selecting a given one of the rules 233, one may be required to enter appropriate information in the associated fields to generate one of the rules 226 associated with the respective destination device 206. Once the appropriate information is entered into the associated fields, one may manipulate the add button or other component to cause the prospective rules 233 to become the rules 226 associated with a given destination device 206.

With reference next to FIG. 4, shown is a user interface 159 that is rendered on an order client 106 (FIG. 1), denoted herein as user interface 159a, according to various embodiments. The user interface 159a lists a number of digital content items 143. The digital content items 143 may include, for example, audio items such as songs or other audio content, video content such as movies or other video content, or other types of digital content as can be appreciated. In the context of the example user interface 159a, each of the digital content items 143 comprises a song listed by song title, album, and a listing of a purchase price for each song. Also, the price may relate to the actual purchase of the digital content item 143 or the rental or other type of purchase of such items as shown.

The digital content items 143 are listed in the user interface 159a in order to facilitate a purchase involving such items 143 such as may be the case, for example, in a purchase involving digital content items 143 over the Internet or other networks. A user of a respective order client 106 may make a purchase involving the content items 143 for themselves or may make a purchase involving the content items 143 for someone else. If the purchase is for someone else, the digital content items 143 purchased may be downloaded to one or more destination devices 206 of the recipient 196 as will be described. In order to make a purchase involving selected items 143 for themselves, a user may select such items by manipulating the appropriate selectors 243 and then manipulate the "purchase" button 246. In response thereto, the electronic commerce applications 126 provide subsequent network pages that facilitate a selection of the ultimate recipients of the digital content items 143 to be purchased, whether they be the purchaser or other recipients.

Referring next to FIG. 5, shown is a user interface 159 generated on the order client 106, denoted herein as user interface 159b, that is generated, for example, in order to specify that digital content items 143 are to be delivered to other recipients 196 according to various embodiments. The user interface 159b is generated on the display device 156 of the order client 106 in order to specify the destination devices 206 to which the selected digital content items 143 are to be delivered. The user interface 159b lists the digital content items 143 selected in the user interface 159a (FIG. 4). In addition, the user interface 159b facilitates associating select ones of the digital content items 143 with recipients 196 of such content items 143 as well as the respective destination devices 206 of the recipients 196.

To this end, the user interface 159b includes a list of potential recipients 263 and a list of selected recipients 266. The user interface 159b also includes recipient search components 269 that may be manipulated to search for a recipient among a plurality of potential recipients 196 stored in the data store 129 (FIG. 1) or other structure. Also, the user interface 159b lists the destination devices 206 along with destination device selectors 273.

Next, a description is provided of the operation of the various components of the user interface 159b. To begin, the user interface 159b allows a given individual to specify the ultimate recipients 196 of the digital content items 143 listed therein. In this respect, the purchaser of the digital content items 143 may maintain an address book or other list of individuals in association with their user account information 136 (FIG. 1) maintained in the data store 129 (FIG. 1). The recipients 196 stored therein are listed in the list of potential recipients 263. By highlighting a potential recipient and manipulating respective selectors 276, a potential recipient is moved into the list of selected recipients 266.

Also, the recipient search components 269 may be manipulated to search for a known individual among all those stored within the data store 129. A resulting list of individuals most closely matching the name entered may be depicted and a user may select respective ones of those listed. By manipulating the selector devices 279, one may direct the selected individuals to be included in the list of selected recipients 266.

Further, individuals may be removed from the list of selected recipients 266 by highlighting a recipient 196 in the list and manipulating the appropriate ones of the selectors 276 or 279. A given one of the individuals listed in the list of selected recipients 266 may be highlighted by clicking or manipulating the name of the individual as shown. Once an individual is highlighted, then the destination devices 206 associated with such individual are depicted at the bottom of the user interface 159b. One may then select which one of the destination devices 206 to which the digital content items 143 are to be sent by clicking or otherwise manipulating the respective destination device selectors 273. If a respective one of the destination devices 206 has been indicated as a default device for a respective type of digital content item (i.e. audio file, video files, or digital text files), then if the digital content item 143 comprises the default media type, the respective default destination device 206 may automatically be selected initially.

Also, for a given highlighted one of the recipients 196 in the list of selected recipients 266, selected ones of the digital content items 143 may be selected by manipulating the toggle devices 283. Thus, selected ones of the digital content items 143 depicted in the user interface 159b may be identified to be sent to a respective destination device 206 of the highlighted one of the recipients 196 listed in the list of selected recipients 266. Once all recipients 196 have been selected and placed in the list of selected recipients 266, and all of the respective digital content items 143 and the respective destination devices 206 have been selected for each one of the recipients, then the purchaser may manipulate the "submit" button 286 to proceed with the purchase involving the digital content items 143 to be delivered to the respective destination devices 206 of the respective recipients 196.

Referring next to FIG. 6, shown is a user interface 159 generated on the display device 156 of the order client 106, denoted herein as user interface 159c, according to various embodiments. The user interface 159c is similar to the user interface 159b (FIG. 5) with the exception that the user interface 159c includes a recipient filter column 303. The recipient filter column 303 includes an indication 306 for each of the digital content items 143. Each indication 306 identifies whether a respective digital content item 143 can be received by the respective recipient 196 based upon the rules 226 (FIG. 2) set forth by the recipient 196 with respect to the selected one of the destination devices 206.

If the rules 226 allow the receipt of a given digital content item 143, then a check mark appears under the recipient filter column 303 in association with the respective digital content item 143. Alternatively, if a given one of the digital content items 143 is not acceptable according to the rules 226 associated with the selected destination device 206, then an "X" appears next to the respective digital content item 143. Also, a warning 309 appears underneath the listing of the digital content items 143 identifying that respective ones of the digital content items 143 cannot be delivered as selected.

As such, a purchaser would not be charged for delivery of such digital content items 143 and the transaction for the purchase involving such digital content items 143 would not be consummated. The user interface 159*c* is similar to the user interface 159*b* (FIG. 5) with the exception that the recipient filter column 303 showing the indications 306 and the warning 309 are provided. In this respect, the user interface 159*c* provides the user with the opportunity to change the states of the selectors 283 associated with the digital content items 143 or make other changes as deemed appropriate based upon any warnings and rejections received of respective digital content items 143 due to the rules 226 set forth by recipients for respective destination devices 206.

Once the user decides that all is in order with respect to the user interface 159*c*, then the user may manipulate the submit button 286 in order to implement the purchase involving the respective digital content items 143. The digital content items 143 are then to be delivered to identified destination devices 206 of the one or more recipients listed in the list of selected recipients 266 as indicated by the selectors 283.

Figure 7:
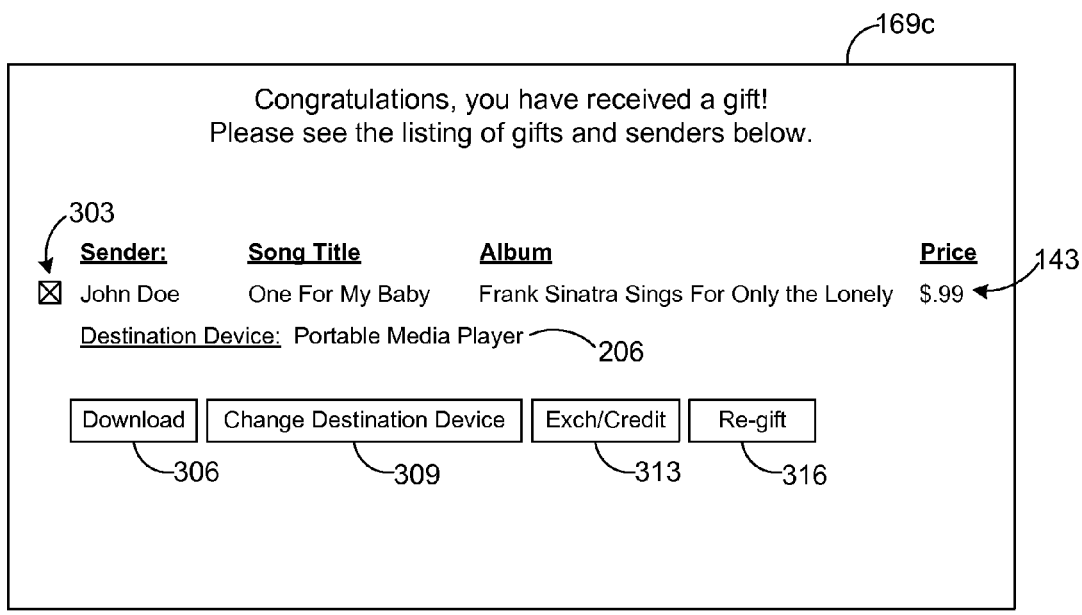
FIG. 7 is a drawing of an example of a network page that facilitates recipient control over the disposition of the digital content item purchased by another in the network of FIG. 1 according to various embodiments of the present disclosure.

Referring next to FIG. 7, shown is a user interface 169, denoted herein as user interface 169*c*, that is generated on the recipient client 109 in order to effect the disposition of a digital content item 143 (FIG. 1) upon consummation of a purchase by another party manipulating the order client 106 as described above. According to one embodiment, a disposition of the digital content item 143 upon a purchase by another party for a given recipient 196 may comprise an automatic download of a digital content item 143 to the respective destination device 206 specified by the purchaser.

Alternatively, the disposition of the digital content item 143 may entail listing the digital content item 143 in a queue associated with the intended recipient specified by the purchaser. The user interface 169*c* may list digital content items 143 in association with a respective destination device 206 to which the digital content item 143 is to be downloaded. The listing of digital content items 143 in the user interface 169*c* may thus include digital content items 143 that were involved in purchases by many different individuals manipulating respective order clients 106 in a manner described above. In this sense, the user interface 169*c* presents a temporary queue that lists the digital content items 143 that have ultimately been involved in purchases for the respective recipient 196 by others. Each of the content items 143 involved in a purchase may be associated with an account number 199 or the name of the recipient 196 for which they were purchased.

The user interface 169*c* provides a recipient 196 control over the disposition of the digital content items 143 listed therein. In particular, each of the digital content items 143 is listed with a selector 303 that may be selected to indicate that such content items 143 are to be processed by the actions that follow. The user interface 169*c* provides for a disposition of the digital content items 143 in the sense that it provides a recipient 196 with the ultimate control over the final delivery or other action taken with respect to the digital content item 143 involved in a purchase by another on behalf of the recipient 196. In this sense, the "disposition" of a digital content item 143 refers to action taken with respect to the digital content item 143 after the consummation of the purchase thereof by another to effect possession of the digital content item 143 or to take such other action deemed appropriate by the recipient 196 consistent with the ownership rights the recipient 196 holds over the digital content item 143. There are several different ways that can ultimately cause the digital content item 143 to reach a final disposition.

In one embodiment, the user interface 169*c* includes a download button 306 that may be manipulated by a user to cause the selected ones of the digital content items 143 to be downloaded to the respective destination devices 206 indicated for such digital content items 143. Once the download button 306 is manipulated, then the third party delivery subsystem 146 (FIG. 1) will attempt to download the respective digital content items 143 to the indicated destination device 206 as is described above. The downloading of the digital content item 143 may be accomplished, for example, according to the discussion set forth in U.S. patent application Ser. No. 11/616,224 entitled "Remote Download of Content" filed on Dec. 26, 2006, which is incorporated herein by reference in its entirety above. If the download of the digital content item 143 is not possible at such time, for example, because the destination device 206 may be inactive or in an "off" state, then the third party delivery subsystem 146 may be configured to continue to attempt to download the digital content item 143 at later times until successful download is achieved.

The user interface 169*c* also provides for an alternative disposition of the digital content items 143 with the rendering of a "change destination device" button 309 that may be manipulated by a user to change the destination device 206 associated with selected ones of the digital content items 143. In this sense, the change destination device button 309 allows a recipient 196 to redirect the download of a respective digital content item 143 to a different one of their destination devices 206, even though the original purchaser may have specified the initial destination device 206. This reflects the fact that the digital content item 143 involved in a given purchase belongs to the recipient 196 at this point and they can do with it whatever they wish.

In addition, the user interface 169*c* further provides for the alternative disposition of the digital content items 143 by virtue of an exchange/credit button 313 and a re-gift button 316. The exchange/credit button 313 may be manipulated by a user who wishes to exchange or receive store credit for a respective selected one of the digital content items 143. This button prompts the third party delivery subsystem 146 to generate appropriate user interfaces to implement an exchange of the digital content item 143 or award credit to the account associated with the recipient 196 toward the purchase of further items. Once an exchange or credit has been implemented, then the digital content item 143 is taken off the list shown in the user interface 169*c*. The implementation of a redirection/re-gifting or exchange of a given item effectively implements a cancellation of the delivery of the digital content item 143 by the recipient.

The re-gift button 316 is manipulated by a recipient 196 to redirect the digital content item 143 to a different recipient 196. In such a situation, the user may not wish to keep the digital content item 143 and may redirect the digital content item 143 to another recipient 196 whom they may feel will appreciate the digital content item 143.

In addition, it may be the case that an address or other contact information associated with a given destination device 206 may have changed such that the addressing information associated with such device in the user account information 136 is stale. If an automatic download is to take place, or if a download is initiated by virtue of the download button 306, then the download of the respective digital content item 143 would fail. In such case, notification may be sent via email or other means to the recipient and the purchaser of the digital content item(s) 143 of the download failure so that they can take action to correct the problem. Alternatively, appropriate user interfaces 169 may be presented to a user that allows a recipient to specify the new address information for the respective destination device 206.

Turning then to FIG. 8, shown is another user interface 169, denoted herein as user interface 169d, that is rendered to a recipient 196 manipulating a recipient client 109 to implement a redirection or re-gifting of a digital content item 143 to another recipient. In this respect, the user interface 169d includes many of the same components of the user interface 159b that was presented to a purchaser who manipulates an order client 106 to identify the recipient(s) 196 of the digital content items 143 as described above. However, the user interface 169d differs in that it provides for the redirection or re-gifting of a digital content item 143 to a new recipient. In this respect, a user may select the recipient of the one or more digital content items 143 that are to be redirected. The user interface 169d facilitates the selection of a new recipient for the digital content item 143 and the destination device(s) 206 associated with the new recipient to which the digital content item 143 is to be delivered.

To this end, the user interface 169d facilitates the selection of a recipient and destination devices 206 in much the same manner as described above with respect to the user interface 159b (FIG. 5). Once the selection of the new recipient 196 and destination device 206 is completed, then a user may manipulate the submit button 286 to cause the digital content item 143 to be disposed with respect to the new recipient 196. In such case, the digital content item 143 may be automatically downloaded to the new destination device 206 or may be listed in a queue associated with the new recipient in a manner similar to the listing of digital content items 143 with respect to the original recipient 196 as described with reference to FIG. 7 above.

Figure 9B:
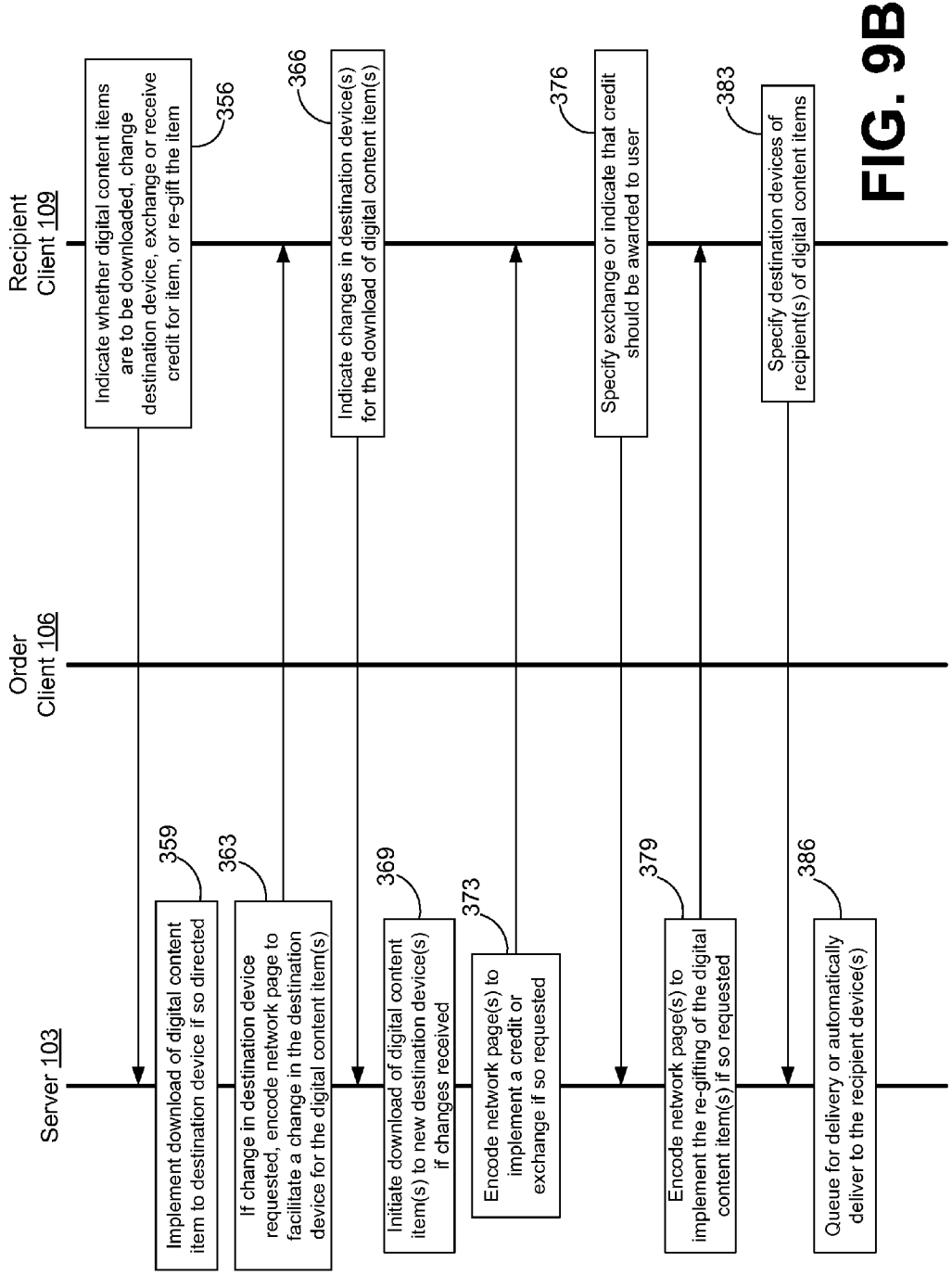

With reference to FIGS. 9A and 9B, shown is a flow diagram depicting one example of operation of the server 103 (FIG. 1), order client 106 (FIG. 1), and the recipient client 109 (FIG. 1) in implementing various transactions as described above. Alternatively, FIGS. 9A and 9B may be viewed as depicting steps of appropriate methods implemented in the server 103, order client 106, and the recipient client 109. The flow diagram of FIGS. 9A and 9B provide context for the description of various functions performed by the server 103, the order client 106, and the recipient client 109 as can be appreciated. While the discussion of FIGS. 9A and 9B refer to the user interfaces described above, it is understood that such interfaces are merely examples of the many different interfaces that may ultimately be used to achieve the same purposes described.

Beginning with box 323, the third party delivery subsystem 146 of the electronic commerce applications 136 (FIG. 1) may include one or more network pages that facilitate the creation of an account by a recipient 196 (FIG. 2) in order to register their destination devices 206 (FIG. 2) and to specify their download preferences 219 (FIG. 2), rules 226 (FIG. 2), and other information. In this respect, third party delivery subsystem 146 may encode a network page that embodies the user interface 169a to be served up to a given recipient client 109 so that the respective recipient 196 can enter such information as is needed so that the third parties can make purchases involving digital items 143 (FIG. 4) therefor as described above. Once the network page is encoded in box 323, it is sent to the respective recipient client 109, for example, in response to a request by the recipient client 109.

In box 326, the recipient client 109 is manipulated to specify destination devices 206, download preferences 219 (FIG. 2), rules 226 (FIG. 2), and any other pertinent information required by the user interface 169a or other user interface. Once the recipient 196 has entered the appropriate information, the same is sent back to the server 103 which can now allow third parties to make purchases involving digital content items 143 for such recipient 196.

Next, in box 329, the third party delivery subsystem 146 is configured to encode network pages that allow an individual to search for and initiate the purchase involving various digital content items 143 for delivery to a second party (a recipient 196). This action may be taken, for example, based upon a request from the order client 106 to specify other recipients 196 for digital content items 143 subject to the purchase. In this respect, the network page may be encoded that is similar to the user interface 159a or other interfaces may be presented. The encoded network page is then sent to the order client 106.

Next, in box 333, the user of an order client 106 may manipulate the network page received to specify digital content items 143 involved in a purchase to be delivered to second parties. In one example, the user may manipulate the user interface 159a as described above. Once the desired digital content items 143 have been specified, the user may manipulate the "purchase" button 246 or other component that causes information to be transmitted to the server 103 to initiate the purchase involving the digital content item(s) 143 and to specify the ultimate recipients 196 of such items. In response, the server 103 may generate appropriate network pages that provide an opportunity for the purchaser to specify whether the digital content items 143 involved in a purchase are to be delivered to their own destination device or the destination device(s) 206 of other recipient(s) 196.

Next, in box 336, the third party delivery subsystem 146 is configured to encode one or more network pages that facilitate the specification of the destination devices 206 of the recipients 196 to which the respective digital content items 143 are to be delivered. The encoded network pages are then sent to the order client 106 so that a given purchaser can specify the respective recipients 196 and the destination devices 206 to which the digital content items 143 are to be delivered. The encoded network pages may embody, for example, content similar to the user interface 159b. The user interfaces served up to the order client 106 may specify that multiple copies of the respective digital content items 143 are to be sent to several different recipients 196 as specified in the list of selected recipients 266 (FIG. 5).

In box 339, the purchaser manipulates the network page to specify the recipients 196 and their destination devices 206, etc., for the respective digital content items 143. The order client 106 then transmits the information specified to the server 103 as shown.

Next, in box 343, the third party delivery subsystem 146 of the electronic commerce applications 126 determines whether the delivery of the digital content items 143 as specified in box 339 to respective recipients 196 is consistent with the rules 226 (FIG. 2) associated with the respective recipients 196. If the delivery of a digital content item 143 is not consistent with the rules 226 (FIG. 2) associated with a given recipient 196, then in box 343 the third party delivery subsystem 146 encodes the network page to facilitate changes to the specified delivery that is then transmitted to the order client 106. Such network page may include the functionality of the user interface 159c as described above.

Thereafter, in box 346, the order client 106 allows a purchaser to specify new destination devices 206 of respective recipients 196 for the digital content items 143 if necessary to comport with the rules 226 specified by given ones of the recipients 196. Alternatively, the user interface presented may provide a purchaser with the option of canceling the purchase involving the respective digital content items 143. Further, additional user interfaces may be presented that allow a purchaser to select alternative digital content items 143 that comport with the rules 226 of the respective recipient 196. Assuming changes are made, the order client 106 transmits such information to the server 103 as shown.

At this point, the third party delivery subsystem 146 as a portion of the electronic commerce applications 126 may initiate the disposition of the digital content items 143 via a network 113, for example, to the respective destination devices 206 of the one or more second parties upon consummation of the purchase involving the digital content items 143 by the purchasers who manipulate the order clients 106. As contemplated herein, the disposition of digital content items 143 may involve automatically downloading such digital content items 143 to the destination devices 206. Alternatively, the disposition of the digital content items 143 may involve listing such digital content items 143 in a queue associated with the respective recipients 196 thereof to allow them to control the disposition of such content items as described above with respect to FIG. 7. In addition, the disposition of the digital content items 143 may involve other actions as can be appreciated.

Thus, in box 349, the third party delivery subsystem 146 implements the purchase involving the digital content items 143 and automatically delivers or downloads the digital content items 143 to the respective destination devices 26, or lists such digital content items 143 in a queue associated with the respective recipients 196, depending upon the download preferences 219 (FIG. 2) specified by the given recipients 196.

Referring to box 353, assuming that digital content items 143 are listed in a queue associated with a given recipient 196, then upon request by a given recipient client 109 manipulated by the respective recipient 196, the third party delivery subsystem 146 is configured to encode one or more network pages that list the digital content items 143 in the queue associated with a given recipient 196. For example, the server 103 may encode a network page that is similar to the user interface 169c (FIG. 7) that is ultimately transmitted to the recipient client 109 as shown.

With reference to box 356, the recipient 196 manipulates the user interface 169c on the recipient client 109 to indicate whether digital content items 143 are to be downloaded to the respective destination devices 206 (FIG. 5), or whether such destination devices 206 are to be changed as described above. Additionally, a user may indicate whether a given digital content item 143 is to be exchanged, or whether to receive store credit for such items. Also, the user interface 169c may allow a digital content item 143 to be redirected or re-gifted to another recipient as described above. Based upon the user manipulation of the network page provided with respect to box 353, then information is transmitted to the server 103 accordingly. Next, in box 359, the third party delivery subsystem 146 implements the download of digital content items 143 to respective destination devices 206 if so directed.

Alternatively, in box 363, the server 103 may encode a network page to facilitate a change in the destination devices 206 for the respective digital content items 143 if the user has indicated that a change in a destination device 206 is requested in box 356. Thereafter, the encoded network pages transmitted to the recipient client 109 is shown. In response, in box 366, the network page is rendered on the recipient client 109. Such network page may comprise, for example, a user interface that facilitates the selection of alternative destination devices 26 in a manner similar that of the user interface 159b implemented on the recipient client 109. Thereafter, information indicating the alternative destination device 206 is transmitted to the server 103 in order to implement the disposition of the respective digital content items 143 in lieu of the changes made.

In box 369, the third party delivery subsystem 146 of the electronic commerce applications 126 may initiate a download of digital content items 143 to the newly identified destination devices 206 in box 366 provided such changes are received in the server 103.

In some cases, a user may manipulate a user interface such as user interface 169c (FIG. 7) to indicate a desire to exchange or receive credit for a digital content item 143 that is the subject of a purchase for the recipient by another. In box 373, the third party delivery subsystem 146 encodes one or more network pages to implement the recording of a credit or to exchange the digital content item 143 for another item. Such network pages can be transmitted to the recipient client 109 to be viewed and manipulated by the recipient 196. However, such user interfaces are not described herein in detail.

In box 376, a given recipient may manipulate the recipient client 109 to specify the exchange or indicate that a credit should be awarded for a given digital content item 143 in accordance with the network pages encoded in box 373 and sent to the recipient client 109 as described above. Once appropriate information is specified in box 376, then the same is transmitted back to the server 103 in order to implement an exchange with respect to, or provide credit for, the respective digital content item 143.

In box 379, the third party delivery subsystem 146 is configured to encode network pages that are transmitted to the recipient client 109 to implement a redirection or re-gifting of one or more digital content items 143 if such was requested in box 356 above. Such network pages may include, for example, the user interface 169d (FIG. 8) or other appropriate interface as can be appreciated. The network pages generated in box 379 are transmitted to the recipient client 109 as shown.

In box 383, the recipient client 109 receives input from a given recipient 196 to redirect or re-gift one or more digital content items 143 to the destination devices 206 of new recipients as was described above. Such information input is then transmitted to the server 103. In box 386, the server may queue such digital content items 143 for the new recipients or may automatically deliver such digital content items 143 to the respective destination devices of the new recipients based upon the download preferences 219 (FIG. 2) specified by the new recipients in their account.

It is understood that the various functions described above as implemented in the server 103, the order client 106, or the recipient client 109 are merely provided as examples of the various functions implemented in order to effect the purchase involving digital content items 143 by a first party for a second party and to effect delivery to the destination devices 206 of the second party as described above. It is understood that there may be other functionality that may be added to the discussion above, where such functionality is included within the scope of this discussion.

Figure 10:
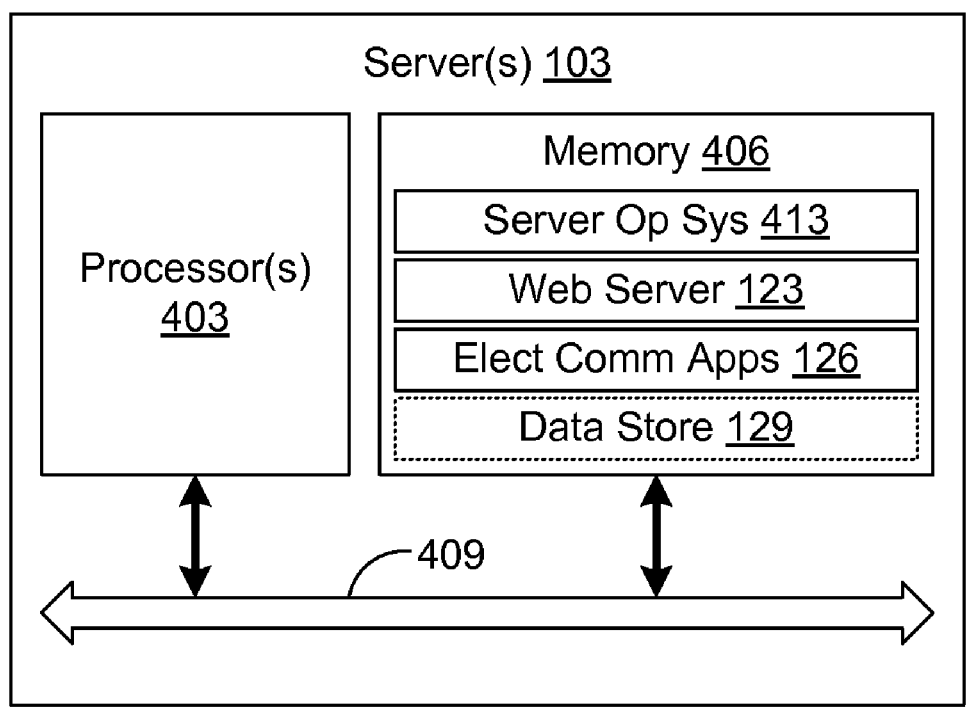
FIG. 10 is a drawing of one example of a server in the network of FIG. 1 according to various embodiments of the present disclosure.

With reference to FIG. 10, shown is one example of a server 103 according to various embodiments. As shown, the server 103 includes a processor circuit having one or more processors 403 and one or more memories 406, each of which is coupled to a local interface 409. The local interface 409 may comprise, for example, an address/control bus as can be appreciated. Alternatively, other processor circuit architectures may be employed. Although not shown, the order client 106 and recipient client 109 may each include a processor circuit similar to the server 103 described above. In this respect, the order client 106 and recipient client 109 may each comprise a processor-based device such as a computer, personal digital assistant, or other like device as can be appreciated.

Stored on the memory 406 and executable by the one or more processors 403 is a server operating system 413, the web server 123, the electronic commerce applications 126, and the data store 129. Additionally, other applications and systems or components may be stored in the memory 406 and executable by the processors 403 as can be appreciated.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a of random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories, etc.

The operating system 413 is executed to control the allocation and usage of hardware resources such as the memory, processing time and peripheral devices in the server 103. In this manner, the operating system 413 serves as the foundation on which applications depend as is generally known by those with ordinary skill in the art.

The functionality of the server 103, order client 106, or recipient client 109 as depicted by the example flow diagram of FIGS. 9A and 9B may be implemented, for example, in an object oriented design or in some other programming architecture. Assuming the functionality is implemented in an object oriented design, then each block represents functionality that may be implemented in one or more methods that are encapsulated in one or more objects. The functionality of the server 103, order client 106, or recipient client 109 may be implemented using any one of a number of programming languages such as, for example, C, C++, JAVA, or other programming languages.

Although the functionality of the server 103, order client 106, or recipient client 109 is described as being embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

Although the flow diagrams of FIGS. 9A-9B show a specific order of execution, it is understood that the order of execution may differ from that which is depicted. For example, the order of execution of two or more blocks may be scrambled relative to the order shown. Also, two or more blocks shown in succession in FIGS. 9A-9B may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the functionality described with reference to FIGS. 1-9B comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain logic for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
   obtaining, by at least one computing device, a selection of content from a first party;
   obtaining, by the at least one computing device, at least one filter rule for each of a plurality of destination devices of a second party;
   sending, by the at least one computing device, a network page that includes a list of the plurality of destination devices of the second party to the first party;
   obtaining, by the at least one computing device, a selection of at least one of the plurality of destination devices of the second party from the first party;
   determining, by the at least one computing device, whether the selected content satisfies the filter rules for the selected at least one of the plurality of destination devices of the second party;
   based at least in part on the determining, calculating, by the at least one computing device, a transaction price for the selected content that satisfies the filter rules for the selected at least one of the plurality of destination devices of the second party; and
   enabling access to the selected content that satisfies the filter rules, wherein enabling access comprises:
   delivering, by the at least one computing device, the selected content that satisfies the filter rules to the selected at least one of the plurality of destination devices of the second party; or
   listing, by the at least one computing device, the selected content that satisfies the filter rules in a queue of the selected at least one of the plurality of destination device of the second party.

2. The method of claim 1, further comprising the step of encoding, in the at least one computing device, at least one network page that facilitates a specification of the filter rules.

3. The method of claim 1, where the step of delivering, by the at least one computing device, the selected content that satisfies the filter rules further comprises the step of automatically downloading the selected content to the selected at least one of the plurality of destination devices of the second party via a network.

4. The method of claim 1, where the step of delivering, by the at least one computing device, the selected content that satisfies the filter rules further comprises the steps of:
   associating the selected content with a delivery queue associated with the second party; and
   downloading the selected content to the selected at least one of the plurality of destination devices of the second party via a network in response to an input received from the second party.

5. The method of claim 1, wherein one of the at least one filter rule for a respective one of the destination devices is based at least in part on whether the selected content has already been delivered to the second party at the respective one of the destination devices.

6. The method of claim 1, further comprising the step of encoding, in the at least one computing device, at least one network page that facilitates a cancellation of the delivery of the selected content by the second party.

7. The method of claim 6, further comprising the step of encoding, in the at least one computing device, at least one network page that facilitates a redirection by the second party of the delivery of the selected content to an alternative destination device associated with a third party.

8. The method of claim 6, further comprising the step of encoding, in the at least one computing device, at least one network page that facilitates exchanging the selected content for an alternative item.

9. A method, comprising the steps of:
   obtaining, by at least one computing device, a selection of content from a first party;
   obtaining, by the at least one computing device, at least one filter rule for each of a plurality of destination devices of a second party;
   rendering for display, by the at least one computing device, a list of the plurality of destination devices of the second party to the first party;
   obtaining, by the at least one computing device, a selection of at least one of the plurality of destination devices of the second party from the first party;
   determining, by the at least one computing device, whether the selected content satisfies the filter rules for the selected at least one of the plurality of destination devices of the second party;
   based at least in part on the determining, calculating, by the at least one computing device, a transaction price for the selected content that satisfies the filter rules for the selected at least one of the plurality of destination devices of the second party; and
   enabling access to the selected content that satisfies the filter rules, wherein enabling access comprises:
   delivering, by the at least one computing device, the selected content that satisfies the filter rules to the selected at least one of the plurality of destination devices of the second party; or
   listing, by the at least one computing device, the selected content that satisfies the filter rules in a queue of the selected at least one of the plurality of destination device of the second party.

10. The method of claim 9, further comprising the step of rendering for display, in the at least one computing device, an indication as to whether the selected content satisfies the filter rules for the selected at least one of the plurality of destination devices of the second party.

11. The method of claim 9, where, once enabled, the delivery of the selected content comprises an automatic delivery of the selected content to the selected at least one of the plurality of destination devices of the second party.

12. The method of claim 9, where, once enabled the delivery of the selected content further comprises the step of listing the selected content in a delivery queue associated with the second party.

13. A system, comprising:
   a hardware processor; and
   a computer-readable storage medium having code stored thereon that when executed by a hardware processor causes the hardware processor to perform the steps of:
   obtaining a selection of content from a first party;
   obtaining at least one filter rule for each of a plurality of destination devices of a second party;

sending a network page that includes a list of the plurality of destination devices of the second party to the first party;
obtaining a selection of at least one of the plurality of destination devices of the second party from the first party;
determining whether the selected content satisfies the filter rules for the selected at least one of the plurality of destination devices of the second party;
based at least in part on the determining, calculating a transaction price for the selected content that satisfies the filter rules for the selected at least one of the plurality of destination devices of the second party; and
enabling access to the selected content that satisfies the filter rules, wherein enabling access comprises:
delivering, by the at least one computing device, the selected content that satisfies the filter rules to the selected at least one of the plurality of destination devices of the second party; or
listing, by the at least one computing device, the selected content that satisfies the filter rules in a queue of the selected at least one of the plurality of destination device of the second party.

14. The system of claim 13, wherein the computer-readable storage medium has code stored thereon that when executed causes the hardware processor to encode at least one network page to facilitate a specification of the filter rules by the second party.

15. The system of claim 13, wherein the delivering of the selected content further comprises automatically downloading the selected content to the selected at least one of the plurality of destination devices of the second party.

16. The system of claim 13, wherein the delivering of the selected content further comprises:
associating the selected content with a delivery queue associated with the second party; and
downloading the selected content to the selected at least one of the plurality of destination devices of the second party in response to an input received from the second party.

17. The system of claim 13, wherein one of the at least one filter rule for a respective one of the destination devices is based at least in part on whether the selected content has already been delivered to the second party at the respective one of the destination devices.

18. The system of claim 13, wherein the computer-readable storage medium has code stored thereon that when executed causes the hardware processor to encode at least one network page to facilitate a cancellation of the delivery of the selected content by the second party.

19. The system of claim 18, wherein the computer-readable storage medium has code stored thereon that when executed causes the hardware processor to encode at least one network page to facilitate a redirection by the second party of the delivery of the selected content to an alternative destination device associated with a third party.

20. The system of claim 18, wherein the computer-readable storage medium has code stored thereon that when executed causes the hardware processor to encode at least one network page to facilitate exchanging the selected content for an alternative item.

21. A non-transitory computer-readable storage medium having code stored thereon that when executed by a hardware processor causes the hardware processor to perform the steps of:
obtaining a selection of content from a first party;
obtaining at least one filter rule for each of a plurality of destination devices of a second party;
sending a network page that includes a list of the plurality of destination devices of the second party to the first party;
obtaining a selection of at least one of the plurality of destination devices of the second party from the first party;
determining whether the selected content satisfies the filter rules for the selected at least one of the plurality of destination devices of the second party;
based at least in part on the determining, calculating a transaction price for the selected content that satisfies the filter rules for the selected at least one of the plurality of destination devices of the second party; and
enabling access to the selected content that satisfies the filter rules, wherein enabling access comprises:
delivering, by the at least one computing device, the selected content that satisfies the filter rules to the selected at least one of the plurality of destination devices of the second party; or
listing, by the at least one computing device, the selected content that satisfies the filter rules in a queue of the selected at least one of the plurality of destination device of the second party.

22. The non-transitory computer-readable storage medium of claim 21, further comprising code stored thereon that when executed causes the hardware processor to encode at least one network page to facilitate a specification of the filter rules by the second party.

23. The non-transitory computer-readable storage medium of claim 21, wherein the delivering of the selected content further comprises automatically downloading the selected content to the selected at least one of the plurality of destination devices of the second party.

24. The non-transitory computer-readable storage medium of claim 21, wherein the delivering of the selected content further comprises:
associating the selected content with a delivery queue associated with the second party; and
downloading the selected content to the selected at least one of the plurality of destination devices of the second party in response to an input received from the second party.

25. The non-transitory computer-readable storage medium of claim 21, wherein one of the at least one filter rule for a respective one of the destination devices is based at least in part on whether the selected content has already been delivered to the second party at the respective one of the destination devices.

26. The non-transitory computer-readable storage medium of claim 21, further comprising code stored thereon that when executed by the hardware processor causes the hardware processor to perform the steps of: encoding at least one network page to facilitate a cancellation of the delivery of the selected content by the second party.

27. The non-transitory computer-readable storage medium of claim 26, further comprising code stored thereon that when executed by the hardware processor causes the hardware processor to perform the steps of: encoding at least one network page to facilitate a redirection by the second party of the delivery of the selected content to an alternative destination device associated with a third party.

28. The non-transitory computer-readable storage medium of claim 26, further comprising code stored thereon that when executed by the hardware processor causes the hardware processor to perform the steps of: encoding at least one network page to facilitate exchanging the selected content for an alternative item.

29. The method of claim 1, wherein the selected content is a digital content item.

30. The method of claim 9, wherein the selected content is a digital content item.

31. The system of claim 13, wherein the selected content is a digital content item.

* * * * *